United States Patent [19]

Tsai et al.

[11] Patent Number: 5,733,512
[45] Date of Patent: Mar. 31, 1998

[54] OZONE GENERATING DEVICE

[75] Inventors: Ming-Jye Tsai, Changhua; Shih-Che Lo, Ilan; Ray-Ten Chen; Tung-Chuan Wu, both of Hsinchu, all of Taiwan

[73] Assignee: Industrial Technology Research Institute, Hsinchu, Taiwan

[21] Appl. No.: 844,279

[22] Filed: Apr. 18, 1997

[51] Int. Cl.⁶ .............................. B01J 19/12; C01B 13/11
[52] U.S. Cl. ................................ 422/186.15; 422/186.2
[58] Field of Search ........................ 422/186.07, 186.21, 422/186.22, 186.15, 186.2; 204/176

[56] References Cited

U.S. PATENT DOCUMENTS

| | | | |
|---|---|---|---|
| 832,767 | 10/1906 | Bridge | 422/186.07 |
| 4,062,748 | 12/1977 | Imris | 204/176 |
| 4,507,266 | 3/1985 | Satoh et al. | 422/186.15 |
| 5,478,533 | 12/1995 | Inculet | 422/186.07 |

*Primary Examiner*—Daniel J. Jenkins
*Attorney, Agent, or Firm*—W Wayne Liauh

[57] ABSTRACT

The present invention relates to an ozone generating device, comprising: a main body, having a cavity, on the lateral sides further having a plurality of inlet holes, which connect the cavity to the exterior to let in air, and on the top side having a plurality of outlet holes, which connect the cavity to the exterior to let out air with ozone; two electrodes, attached to the bottom and the top side of the cavity, for generating an electric discharge, so as to generate ozone in the cavity; and a heating device, installed below the electrode at the bottom side of the cavity, so as to heat the electrode and, indirectly, air in the cavity; wherein heating the first electrode by the heating device allows the operating voltage for generating an electric discharge to be reduced and heating the air with ozone within the cavity causes it to drift upward and to flow out of the cavity through the outlet holes.

11 Claims, 9 Drawing Sheets

OZONE GENERATING DEVICE

BACKGROUND OF THE INVENTION

1. Field of the Invention

The present invention relates to an ozone generating device, particularly to an ozone generating device operating with reduced voltage and producing a quantity of ozone controllable by the applied voltage and by a heating device, where the quantity of ozone generated is also given by the number of generating elements combined, according to the space available.

2. Description of Related Art

The oxidizing effect of ozone helps to kill bacteria, remove bad odor and disinfect rooms. For these purposes, ozone is widely used in industry, medicine and in households. Ozone is generated by electrolysis, UV rays or electric arcs. As shown in FIGS. 7-9, in a conventional device for generating ozone using an electric arc, one of the two electrodes is shaped like a grid, and the other has several pointed protrusions. The two electrodes are connected to a high-voltage high-frequency generator. Air is let through the space between the two electrodes, and the high-voltage high-frequency generator causes a gas discharge therein, which in turn leads to the generation of ozone. The method of using a high-voltage high-frequency generator, however, causes electromagnetic interference with other devices, hampering their function or safety.

Since ozone is a very effective oxidizer, a too high concentration thereof has an adverse effect on health and the environment. On the other hand, an insufficient concentration of ozone has no effect. Therefore, controlling the concentration of ozone is important. In conventional ozone generating devices, operating with high-voltage high-frequency generators, fine adjusting of the ozone output is difficult, so, generally, there are just three selectable levels of output. This is often not sufficient.

The ozone generated in a conventional device does not spread on its own within the intended space. So air has to be pressed through with the help of a fan. The heat of the electric discharge requires additional cooling. These additional devices increase the volume of the ozone generator.

SUMMARY OF THE INVENTION

An object of the present invention is to provide an ozone generating device with reduced operating voltage and transport of air and ozone by convection.

Another object of the present invention is to provide a stably working ozone generating device.

A further object of the present invention is to provide an ozone generating device of reduced volume.

A further object of the present invention is to provide a ozone generating device, which is combinable from single molded forms.

A further object of the present invention is to provide an ozone generating device, which emplys a simple method to generate ozone.

A further object of the present invention is to provide an ozone generating device, which allows for continuous adjusting of the output.

The present invention can be more fully understood by reference to the following description and accompanying drawings.

DETAILED DESCRIPTION OF THE PREFERRED EMBODIMENTS

Figure 1:
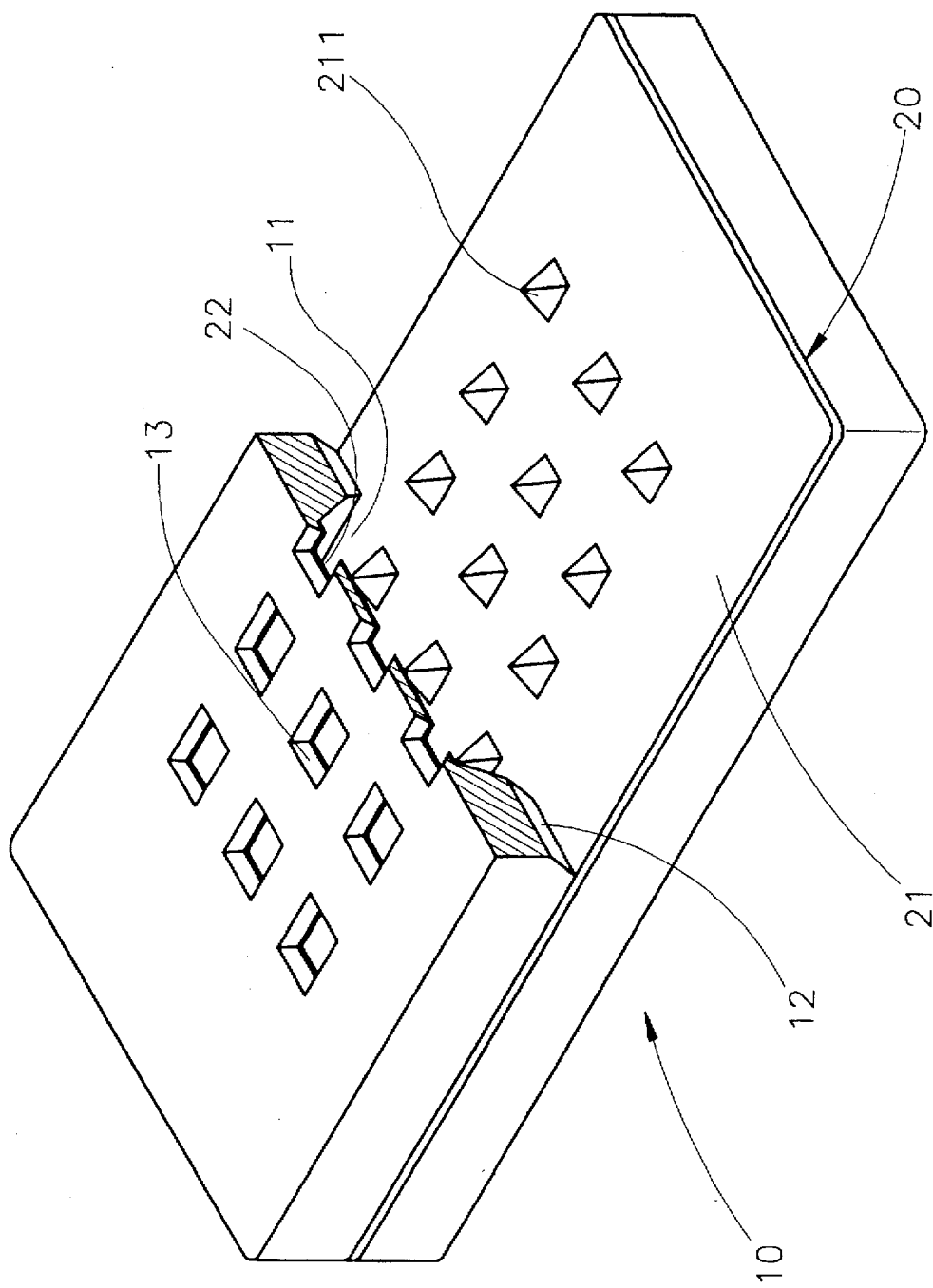
FIG. 1 is a schematic illustration of the ozone generating device of the present invention.
Figure 2:
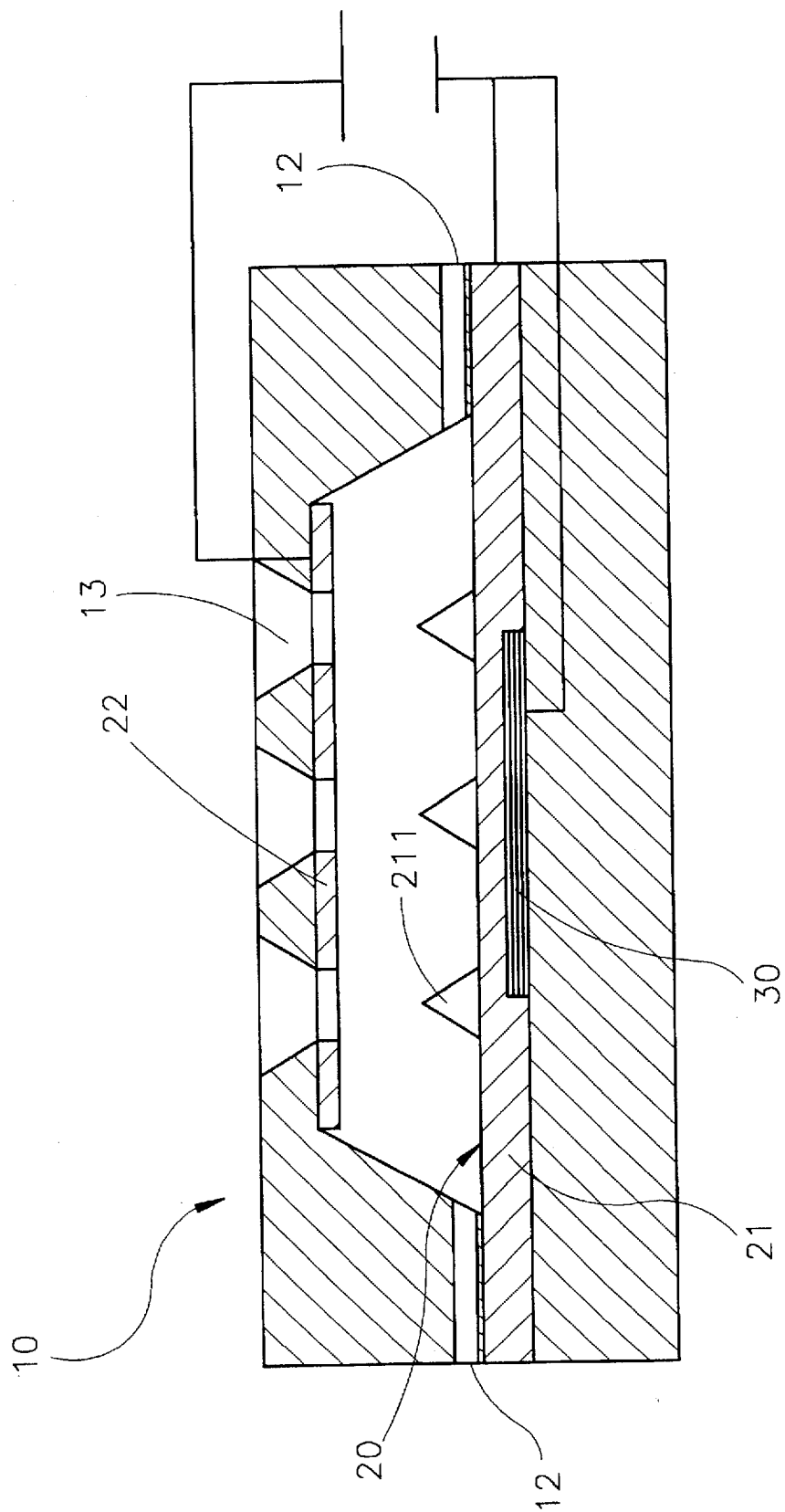
FIG. 2 is a sectional view of the present invention, showing the assembly of the structural parts.
Figure 3:
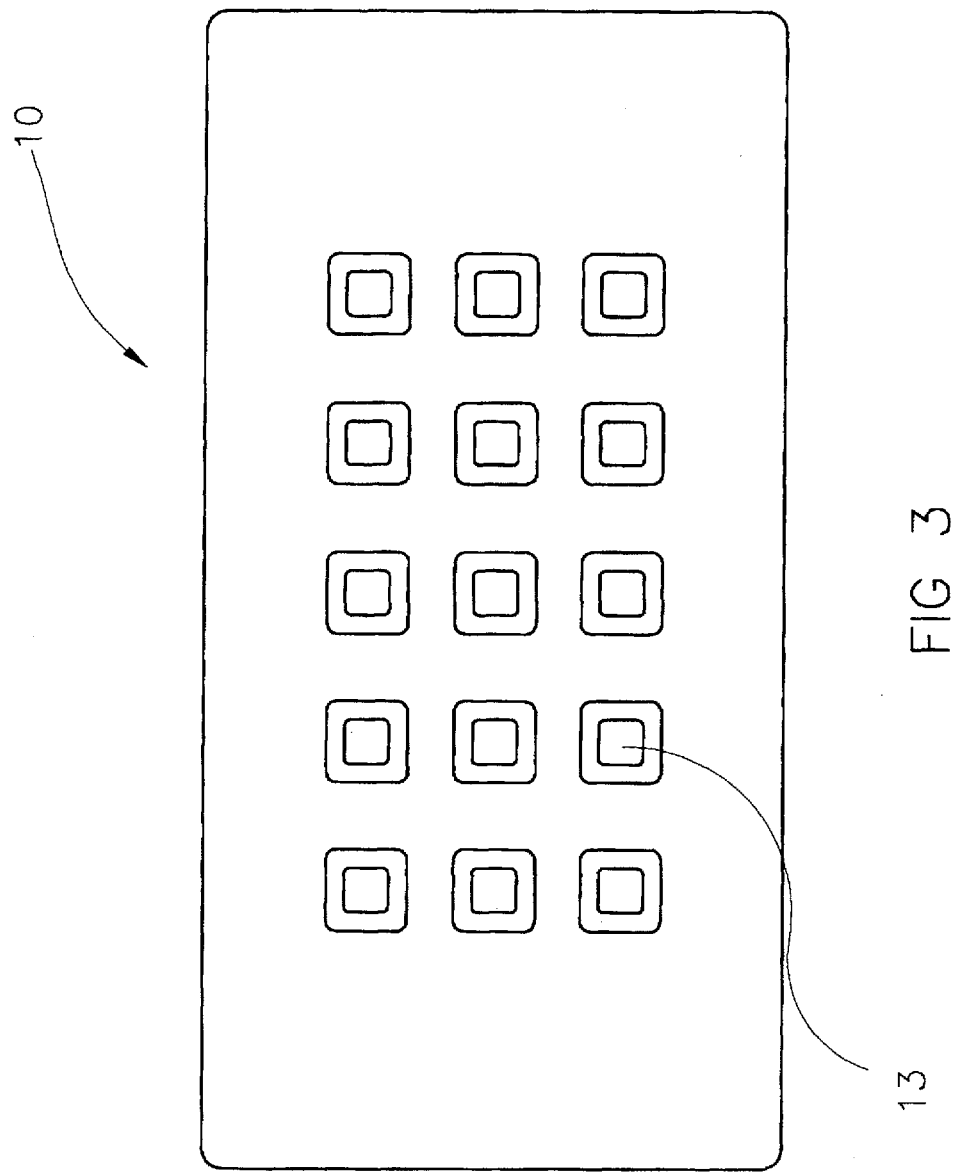
FIG. 3 is a planar view of the present invention.

Referring to FIGS. 1-6, the present invention has a ozone generating device 1, comprising a main body 10, two electrodes 20, installed in the main body 10, and a heating device 30 for heating the electrode 20 and allowing for generating ozone at a lower operating voltage.

As shown in FIGS. 1-4, the main body 10 has the external shape of a flat square stone. Inside the main body 10, a cavity 11 is left open. The lateral sides of the main body 10 have a plurality of inlet holes 12, which extend horizontally towards the interior of the main body 10 and connect the outside of the main body 10 with the cavity 11. The upper side of the main body 10 has a plurality of outlet holes 13, which extend vertically with decreasing cross-section towards the interior of the main body 10 and connect the outside of the main body 10 with the cavity 11. Air flows through the inlet holes 12 into the cavity 11, passes the electrodes 20, where ozone is generated, and leaves the cavity 11 through the outlet holes 13.

Figure 4:
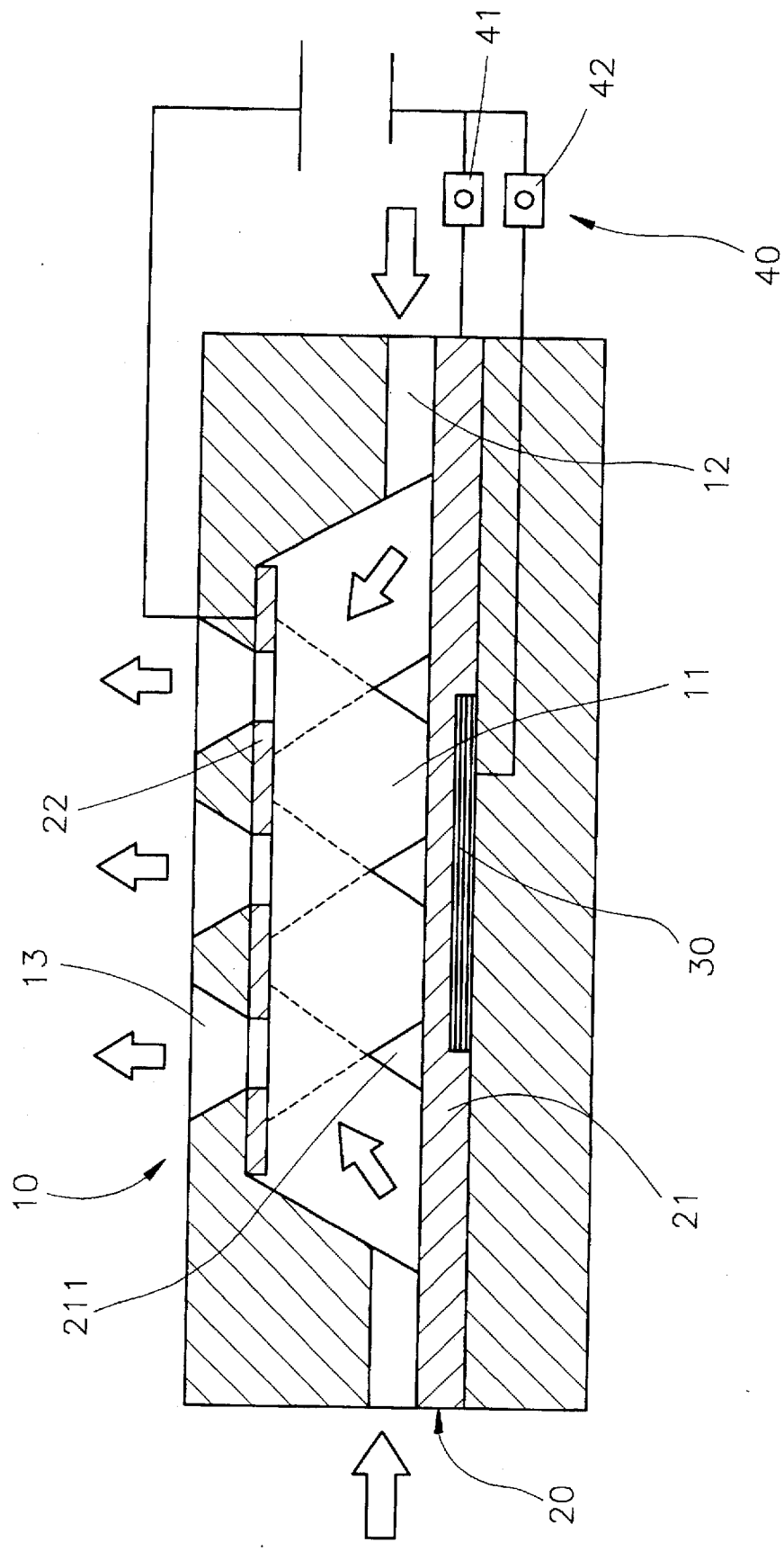
FIG. 4 is a schematic illustration in section of the ozone generating process of the present invention.
Figure 5:
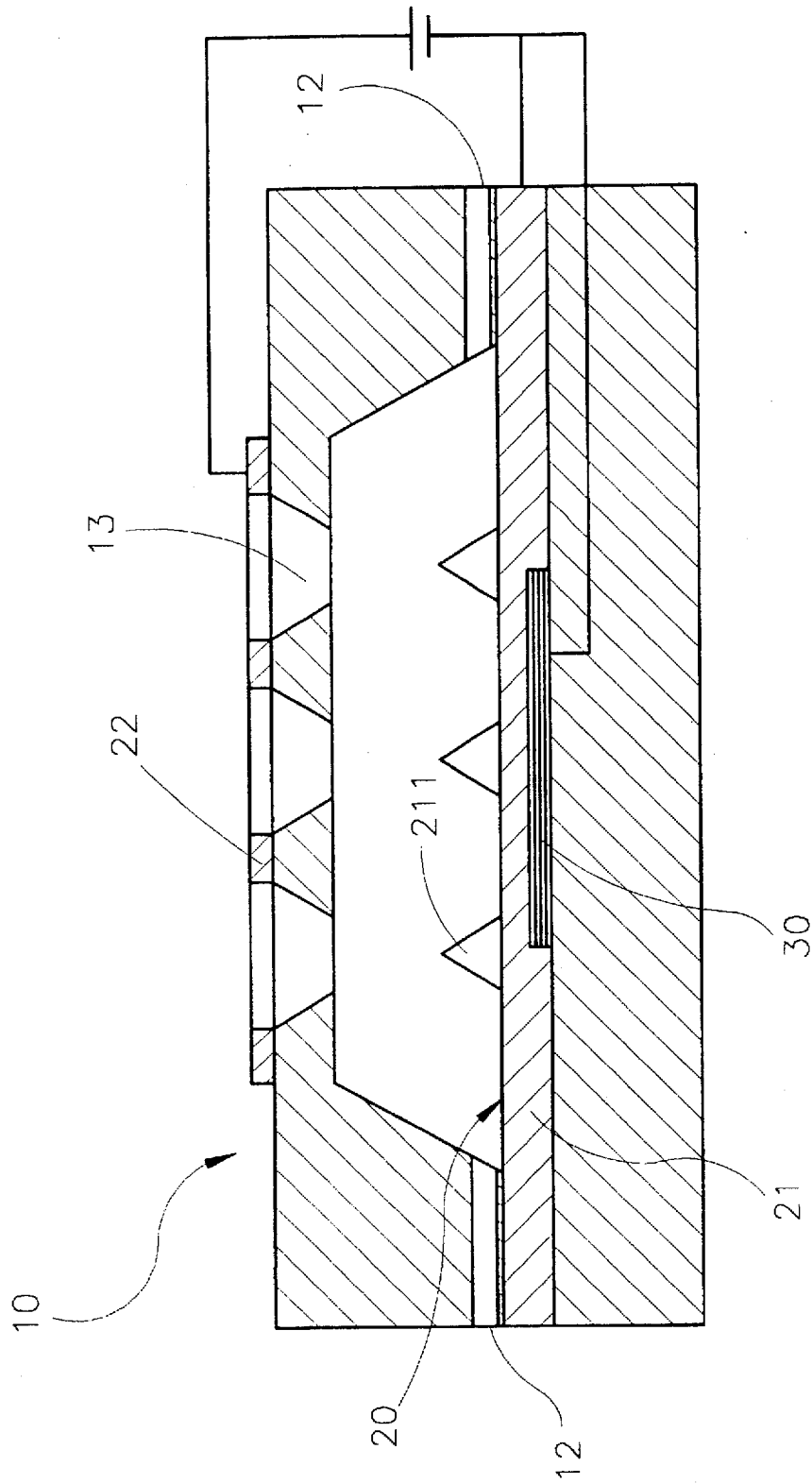
FIG. 5 is a schematic illustration of another setup of the electrodes of the present invention.
Figure 6:
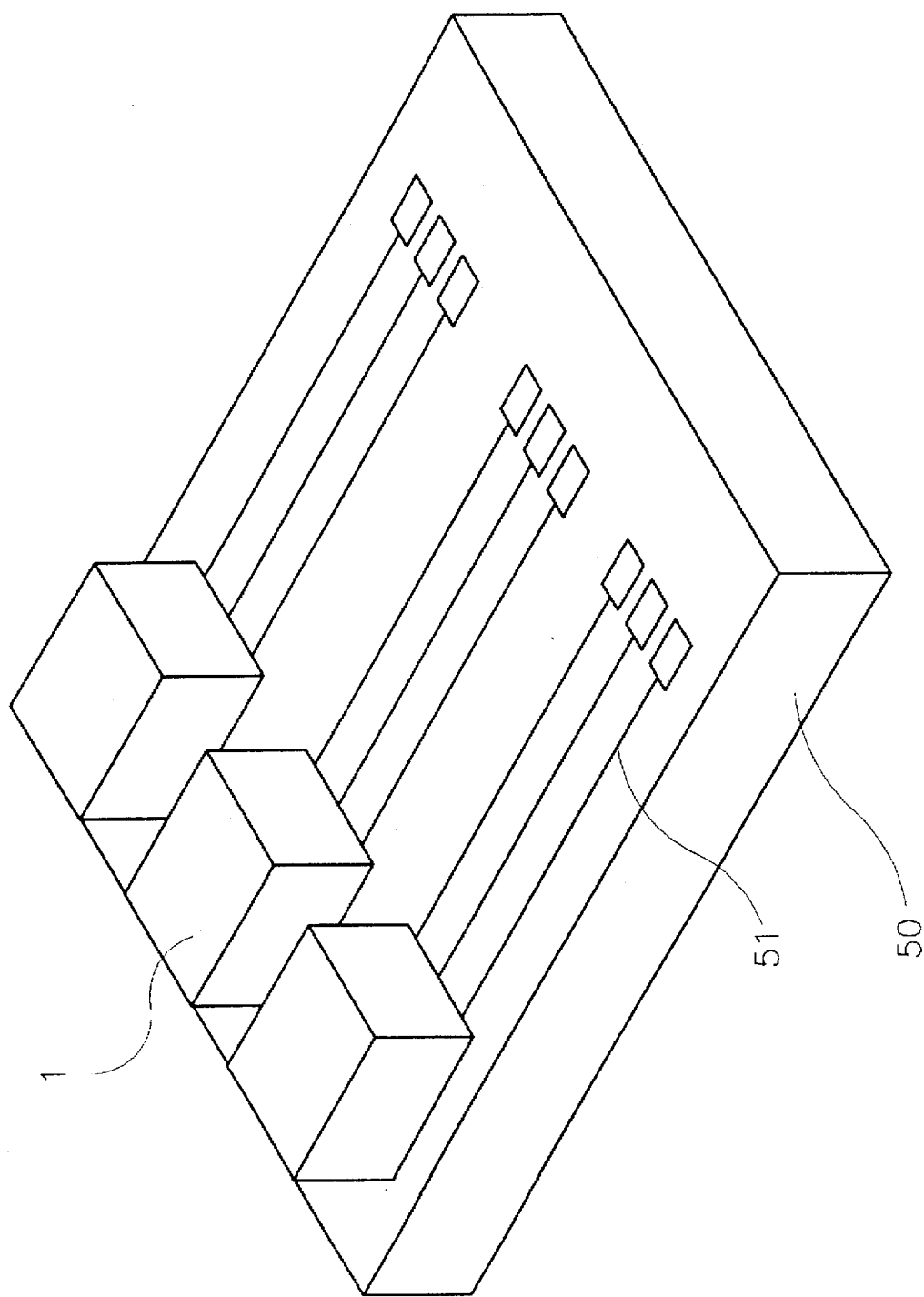
FIG. 6 is a schematic illustration of the combination of single devices of the present invention.
Figure 7:
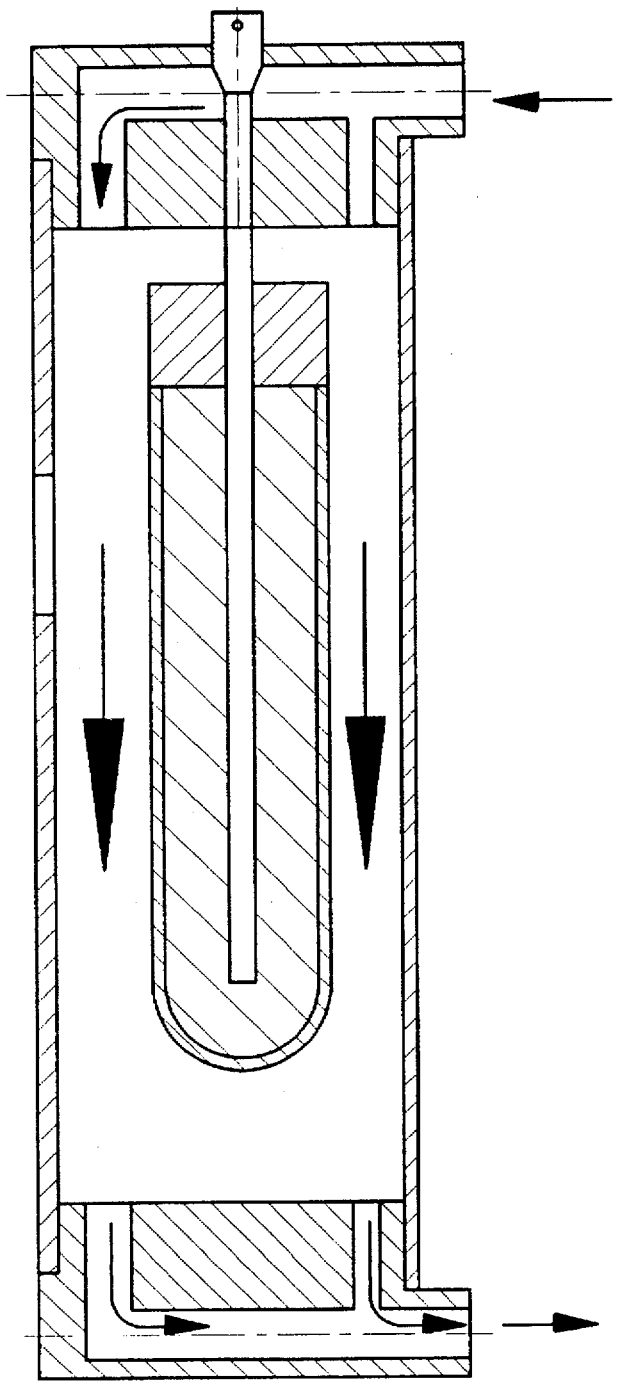
FIG. 7 (prior art) is a schematic illustration of a conventional tube-like ozone generating device.
Figure 8:
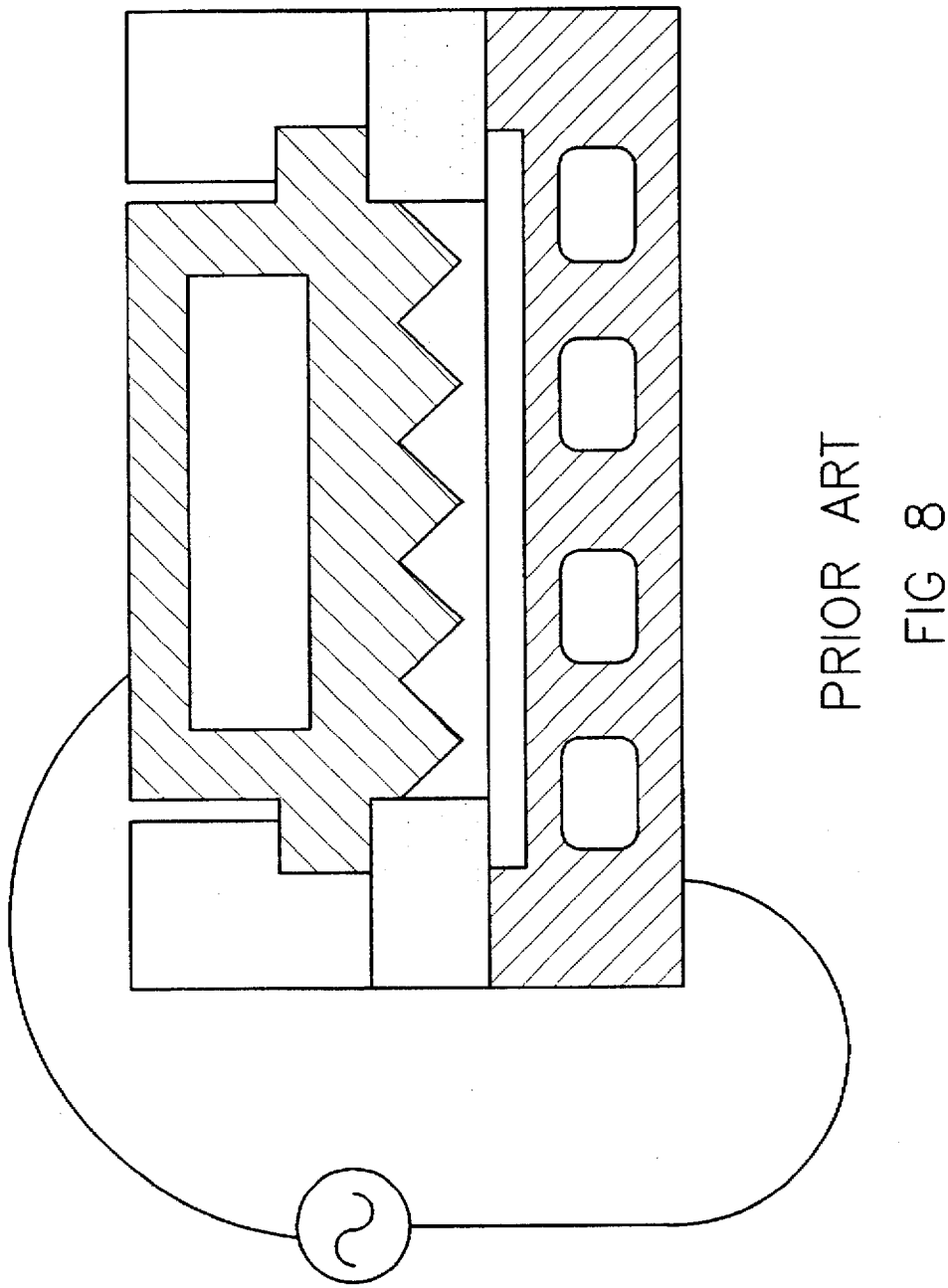
FIG. 8 (prior art) is a schematic illustration of a conventional flat ozone generating device with a jagged electrode.
Figure 9:
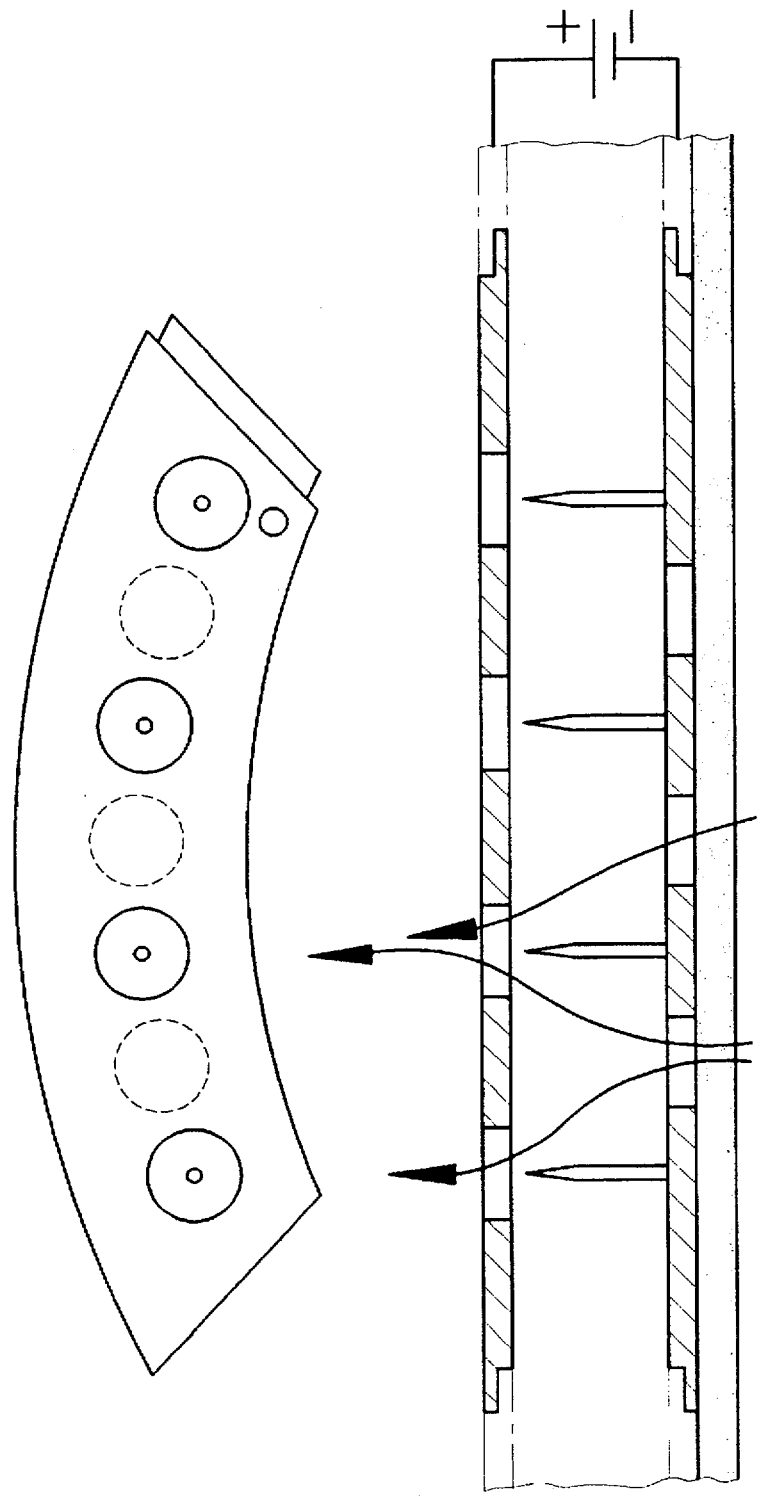
FIG. 9 (prior art) is a schematic illustration of a conventional flat ozone generating device with an electrode having a plurality of discharge needles.

As shown in FIGS. 2-5, the two electrodes 20 are formed as thin plates or chips and comprise a discharge electrode 21 and an induction electrode 22. The induction electrode 22 is attached to the top side of the cavity 11 within the main body 10. In an alternative setup, as shown in FIG. 5, the induction electrode 22 is placed outside the cavity 11, above the holes 13. The discharge electrode 21 is attached to the bottom side of the cavity 11, insulated from the induction electrode 21 and keeping a distance therefrom. The discharge electrode 21 has a plurality of pointed protrusions 211, which extend upwards, pointing into the interior of the cavity 11. Electric point discharges are generated between the peaks of the protrusions 211 and the induction electrode 22. The electric point discharges cause oxygen molecules ($O_2$) in the air flowing through the cavity 11 to split into single oxygen atoms (O), which afterwards combine with $O_2$ molecules to form ozone molecules ($O_3$).

The heating device 30 is installed below the discharge electrode 21 and heats it. Thereby the voltage between the electrodes 20 that is necessary for an electric discharge is reduced to about 40V to 50V under practical conditions. The heat from the heating device 30 is conducted to the protrusions 211, warming the air with the ozone in the cavity 11. The heated air with the ozone drifts upward, leaving the cavity 11 through the outlet holes 13, while fresh air flows into the cavity by convection. At the same time, humidity in the inflowing air is vaporized.

Since the ozone generating device 1 of the present invention is provided with the heating device 30, ozone is generated at a low voltage, and interfering with other devices caused by the use of high voltage in conventional ozone generating devices is avoided. Moreover, it is not necessary to remove excess heat. This allows for a small volume of the ozone generating device 1. The distance between the peaks of the protrusions 211 and the induction electrode 22 is reducible to a micron, keeping the operating voltage low and the volume small.

The heating device 30 also warms up the air with ozone within the cavity 11, such that the air with ozone drifts upwards and leaves the cavity 11, without the help of a fan. At the same time, by convection fresh air flows into the cavity 11. So the design of the ozone generating device of the present invention is simple, and no additional volume is needed.

Referring to FIG. 4, the ozone generating device 1 of the present invention is provided with a control device 40 for controlling the quantity of ozone generated. The control device 40 comprises a voltage control unit 41 and a temperature control unit 42. The voltage control unit 41 is installed in the terminals leading to the electrodes 20 and controls the voltage between the electrodes 20. The temperature control unit 42 is installed in the wiring leading to the heating device 30 and controls the temperature of the electrodes 20. Thereby, the quantity of ozone generated is continuously tunable.

Since the ozone generating device 1 of the present invention operates at low voltage, without electrically interfering with other devices, multiple ozone generating devices can be mounted on a common support 50, according to the desired ozone generation rate. Multiple wiring 51 connects to the ozone generating devices 1. The ozone generating devices 1 with the wiring 51 on the support 50 are combined from single molded forms according to the desired ozone generation rate and the available volume.

What is claimed is:

1. An ozone generating device, comprising:

a main body with an exterior, an interior, an upper side and lateral sides, having a cavity with a top side and a bottom side in said interior, said main body on said lateral sides further having a plurality of inlet holes, which connect said cavity to said exterior to let in air, and on said top side having a plurality of outlet holes, which connect said cavity to said exterior to let out air with ozone;

a first electrode and a second electrode, said first electrode attached to said bottom side of said cavity, said second electrode attached to said top side of said cavity, with an operating voltage applied between said first and second electrodes for inducing an electric discharge, so as to generate ozone in said cavity; and a heating device, installed below said first electrode, so as to heat said first electrode to an operating temperature and, indirectly, said air with ozone in said cavity;

wherein heating said first electrode by said heating device allows said operating voltage for generating an electric discharge to be reduced and wherein convection by heating said air with ozone within said cavity causes said air with ozone to drift upward and flow to said exterior through said outlet holes.

2. An ozone generating device according to claim 1, wherein said inlet holes are placed close to said bottom side of said cavity, so as to enhance the air flow by convection.

3. An ozone generating device according to claim 1, wherein said outlet holes have a cross-section which widens towards said exterior of said main body, so as to disperse outflowing air.

4. An ozone generating device according to claim 1, wherein said first electrode has a plurality of pointed protrusions to generate an electric point discharge.

5. An ozone generating device according to claim 1, wherein said second electrode is placed on said upper side of said main body.

6. An ozone generating device according to claim 1, wherein said second electrode is placed above said outlet holes on said upper side of said main body.

7. An ozone generating device according to claim 1, wherein a control device is provided for controlling the ozone generation rate.

8. An ozone generating device according to claim 7, wherein said control device comprises a voltage control unit and a temperature control unit, which separately control said operating voltage and said operating temperature.

9. A multiple ozone generating device comprising a plurality of ozone generating devices according to claim 1, in order to adjust to a desired ozone generation rate, said ozone generating devices mounted on a support.

10. A multiple ozone generating device according to claim 9, wherein said support is provided with multiple wiring, connecting to said ozone generating devices.

11. An ozone generating device according to claim 1, wherein said first and second electrodes are made as thin plates or chips, so as to allow for a small volume of said ozone generating device.

* * * * *